United States Patent
Wei et al.

(10) Patent No.: US 10,652,918 B2
(45) Date of Patent: May 12, 2020

(54) INCREASED UPLINK PILOT TIME SLOT LENGTH IN SPECIAL SUBFRAMES

(71) Applicants: QUALCOMM Incorporated, San Diego, CA (US); Chao Wei, Beijing (CN); Wanshi Chen, San Diego, CA (US); Peter Gaal, San Diego, CA (US); Ruiming Zheng, Beijing (CN)

(72) Inventors: Chao Wei, Beijing (CN); Wanshi Chen, San Diego, CA (US); Peter Gaal, San Diego, CA (US); Ruiming Zheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 15/758,157

(22) PCT Filed: Aug. 1, 2016

(86) PCT No.: PCT/CN2016/092763
§ 371 (c)(1),
(2) Date: Mar. 7, 2018

(87) PCT Pub. No.: WO2017/050017
PCT Pub. Date: Mar. 30, 2017

(65) Prior Publication Data
US 2018/0213552 A1    Jul. 26, 2018

(30) Foreign Application Priority Data
Sep. 24, 2015  (WO) ............... PCT/CN2015/090515

(51) Int. Cl.
*H04W 72/12* (2009.01)
*H04L 5/00* (2006.01)
(Continued)

(52) U.S. Cl.
CPC ....... *H04W 72/1268* (2013.01); *H04L 5/0048* (2013.01); *H04L 5/0051* (2013.01);
(Continued)

(58) Field of Classification Search
CPC ......... H04W 72/1268; H04W 72/0446; H04W 52/0219; H04L 5/0048; H04L 27/2613;
(Continued)

(56) References Cited

U.S. PATENT DOCUMENTS

2013/0128781 A1\*  5/2013  Li ..................... H04W 72/0446
                                                                    370/280
2013/0286902 A1\* 10/2013  Chen .................... H04W 24/02
                                                                    370/280
(Continued)

FOREIGN PATENT DOCUMENTS

CN          101414902 A        4/2009
CN          101425844 A        5/2009
(Continued)

OTHER PUBLICATIONS

3GPP 3GPP TS 36.211 V12.6.0 3rd Generation Partnership Project; Technical Specification Group Radio Access Network; Evolved Universal Terrestrial Radio Access (E-UTRA); Physical channels and modulation(Release 12) Jun. 30, 2015 (Jun. 30, 2015).
(Continued)

*Primary Examiner* — Faisal Choudhury
(74) *Attorney, Agent, or Firm* — Norton Rose Fullbright, LLP

(57) ABSTRACT

Increased symbol length of uplink pilot time slots (UpPTS) in special subframes is disclosed in which a configuration of a first special subframe may be independent from configuration of a second special subframe in the same frame, such that the first UpPTS of the first special subframe is longer than the second UpPTS of the second special subframe. The
(Continued)

second UpPTS of the second special subframe may also be longer than legacy UpPTS length in select configurations. A serving base station may select the special subframe configurations in order to balance sounding reference signal (SRS) capacity for compatible user equipments (UEs) and downlink throughput for legacy UEs. The selected special subframe configurations may be transmitted by the serving base stations. In additional aspects, compatible UEs may be configured with at least two separate SRS power control parameters for use in the additional and legacy UpPTS symbols.

30 Claims, 8 Drawing Sheets

(51) Int. Cl.
    *H04W 72/04*     (2009.01)
    *H04L 27/26*     (2006.01)
    *H04L 5/14*     (2006.01)
    *H04W 52/02*     (2009.01)

(52) U.S. Cl.
    CPC .......... *H04L 5/0092* (2013.01); *H04L 5/1469* (2013.01); *H04L 27/2613* (2013.01); *H04W 52/0219* (2013.01); *H04W 72/0446* (2013.01); *H04L 5/0012* (2013.01)

(58) Field of Classification Search
    CPC ... H04L 5/0092; H04L 5/1469; H04L 5/0051; H04L 5/0012
    USPC ......................................................... 370/329
    See application file for complete search history.

(56) References Cited

U.S. PATENT DOCUMENTS

| | | | | |
|---|---|---|---|---|
| 2015/0043392 A1* | 2/2015 | Susitaival | ............ | H04L 5/1469 370/280 |
| 2016/0157248 A1* | 6/2016 | Lin | ........................ | H04W 24/00 370/329 |
| 2017/0048717 A1* | 2/2017 | Yoo | .................... | H04W 72/0453 |

FOREIGN PATENT DOCUMENTS

| | | |
|---|---|---|
| CN | 101868027 A | 10/2010 |
| CN | 102316591 A | 1/2012 |
| CN | 103517425 A | 1/2014 |
| WO | WO-2012051756 A1 | 4/2012 |
| WO | WO-2013162785 | 10/2013 |
| WO | WO-2014019213 A1 | 2/2014 |
| WO | WO-2015113613 A1 | 8/2015 |

OTHER PUBLICATIONS

International Search Report and Written Opinion—PCT/CN2015/090515—ISA/EPO—Jun. 15, 2016.
International Search Report and Written Opinion—PCT/CN2016/092763—ISA/EPO—Oct. 26, 2016.
Supplementary European Search Report—EP16847899—Search Authority—The Hague—Apr. 4, 2019.
ZTE: "Discussion on SRS Capacity Improvement", 3GPP Draft; R1-154855 Discussion on SRS Capacity Improvement, 3rd Generation Partnership Project (3GPP), Mobile Competence Centre, 650, Route Des Lucioles, F-06921 Sophia-Antipolis Cedex, France, vol. RAN WG1, No. Beijing, China; 20150824-20150828 Aug. 30, 2015, XP051021061, Retrieved from the Internet: URL:http://www.3gpp.org/ftp/tsg_ran/WG1_RL1/TSGR1_82/Docs/, 5 pages.

* cited by examiner

INCREASED UPLINK PILOT TIME SLOT LENGTH IN SPECIAL SUBFRAMES

CROSS-REFERENCE TO RELATED APPLICATIONS

This application claims the benefit of PCT International Application No. PCT/CN2015/090515, entitled. "INCREASED UPLINK PILOT TIME SLOT LENGTH IN SPECIAL SUBFRAMES," filed on Sep. 24, 2015, which is expressly incorporated by reference herein in its entirety.

BACKGROUND

Field

Aspects of the present disclosure relate generally to wireless communication systems, and more particularly, to increased length of uplink pilot time slot (UpPTS) in special subframes.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks. Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Various aspects of the present disclosure are directed to an increased symbol length of uplink pilot time slots (UpPTS) in special subframes. In such aspects a configuration of a first special subframe may be independent from configuration of a second special subframe in the same frame, such that the first UpPTS of the first special subframe is longer than the second UpPTS of the second special subframe. The second UpPTS of the second special subframe may also be longer than legacy UpPTS length in select configurations. A serving base station may select the special subframe configurations in order to balance sounding reference signal (SRS) capacity for compatible user equipments (UEs) and downlink throughput for legacy UEs. The selected special subframe configurations may be transmitted by the serving base stations in system information messages or via radio resource control (RRC) signaling to a dedicated UE. In additional aspects, compatible UEs may be configured with at least two separate SRS power control parameters for use in the additional and legacy UpPTS symbols.

In one aspect of the disclosure, a method of wireless communication includes selecting a first special subframe configuration for a first special subframe of a frame, wherein the first special subframe configuration includes a first UpPTS with assigned resources of at least three symbols, and wherein the at least three symbols include two legacy symbols and one or more additional symbols. The method further includes selecting a second special subframe configuration for a second special subframe of the frame, wherein the second special subframe configuration includes a second UpPTS with assigned resources of a second resource length different than a first resource length assigned to the first UpPTS, and transmitting an indication of the first and second special subframe configurations for a coverage area.

In an additional aspect of the disclosure, an apparatus configured for wireless communication includes means for selecting a first special subframe configuration for a first special subframe of a frame, wherein the first special subframe configuration includes a first UpPTS with assigned resources of at least three symbols, and wherein the at least three symbols include two legacy symbols and one or more additional symbols. The apparatus further includes means for selecting a second special subframe configuration for a second special subframe of the frame, wherein the second special subframe configuration includes a second UpPTS with assigned resources of a second resource length different than a first resource length assigned to the first UpPTS, and means for transmitting an indication of the first and second special subframe configurations for a coverage area.

In an additional aspect of the disclosure, a non-transitory computer-readable medium having program code recorded thereon. The program code further includes code to select a first special subframe configuration for a first special subframe of a frame, wherein the first special subframe configuration includes a first UpPTS with assigned resources of at least three symbols, and wherein the at least three symbols include two legacy symbols and one or more additional symbols. The non-transitory computer-readable medium further includes code to select a second special subframe configuration for a second special subframe of the frame, wherein the second special subframe configuration includes a second UpPTS with assigned resources of a second resource length different than a first resource length assigned to the first UpPTS, and code to transmit an indication of the first and second special subframe configurations for a coverage area.

In an additional aspect of the disclosure, an apparatus configured for wireless communication is disclosed. The apparatus includes at least one processor, and a memory coupled to the processor. The processor is configured to select a first special subframe configuration for a first special subframe of a frame, wherein the first special subframe configuration includes a first UpPTS with assigned resources of at least three symbols, and wherein the at least three symbols include two legacy symbols and one or more additional symbols. The apparatus further includes to select a second special subframe configuration for a second special subframe of the frame, wherein the second special subframe configuration includes a second UpPTS with assigned resources of a second resource length different than a first resource length assigned to the first UpPTS, and to transmit an indication of the first and second special subframe configurations for a coverage area.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
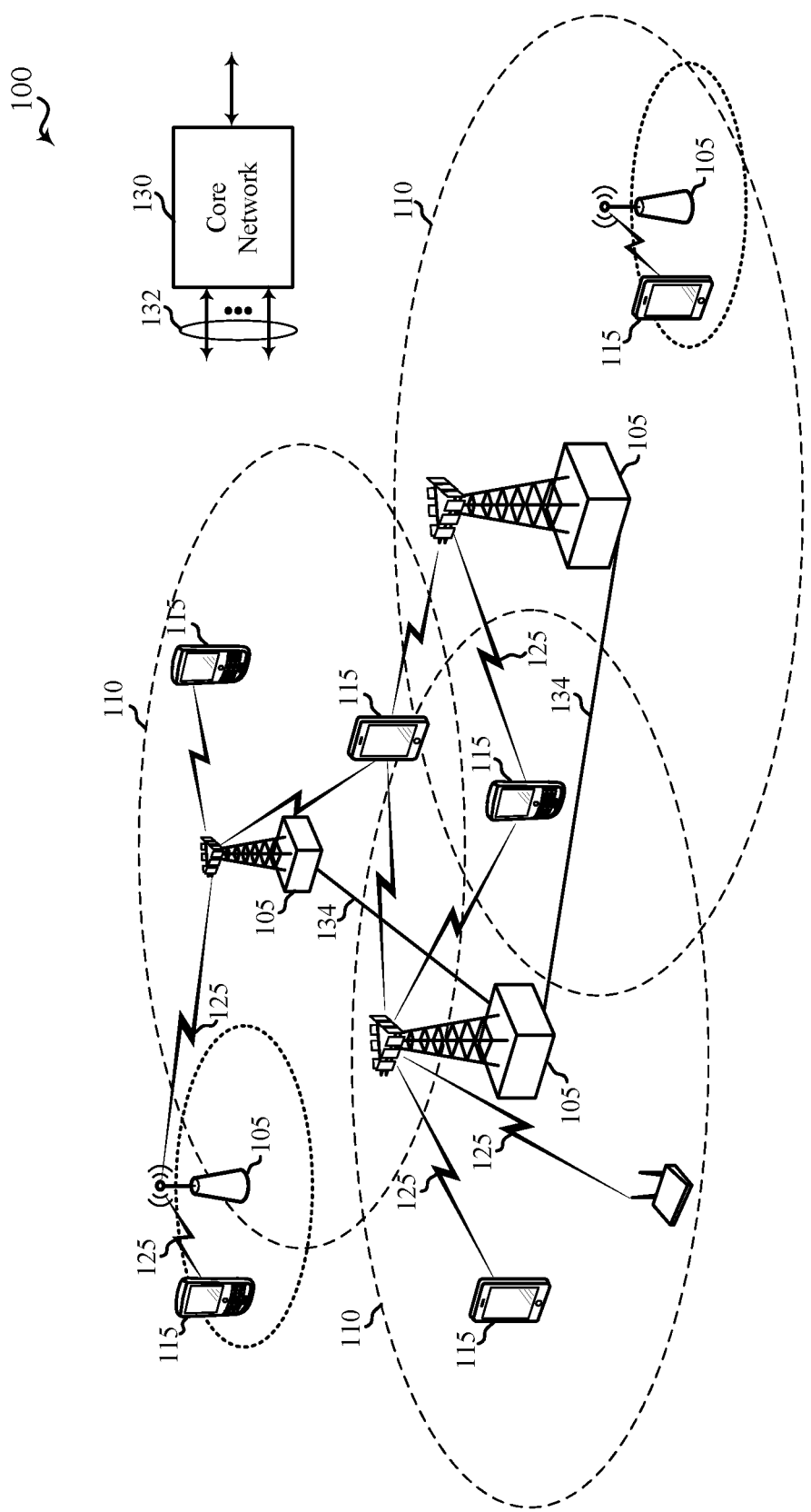
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16. IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including in unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas, however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz. or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a. 110b and 110c are macro eNBs for the macro cells 102a. 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
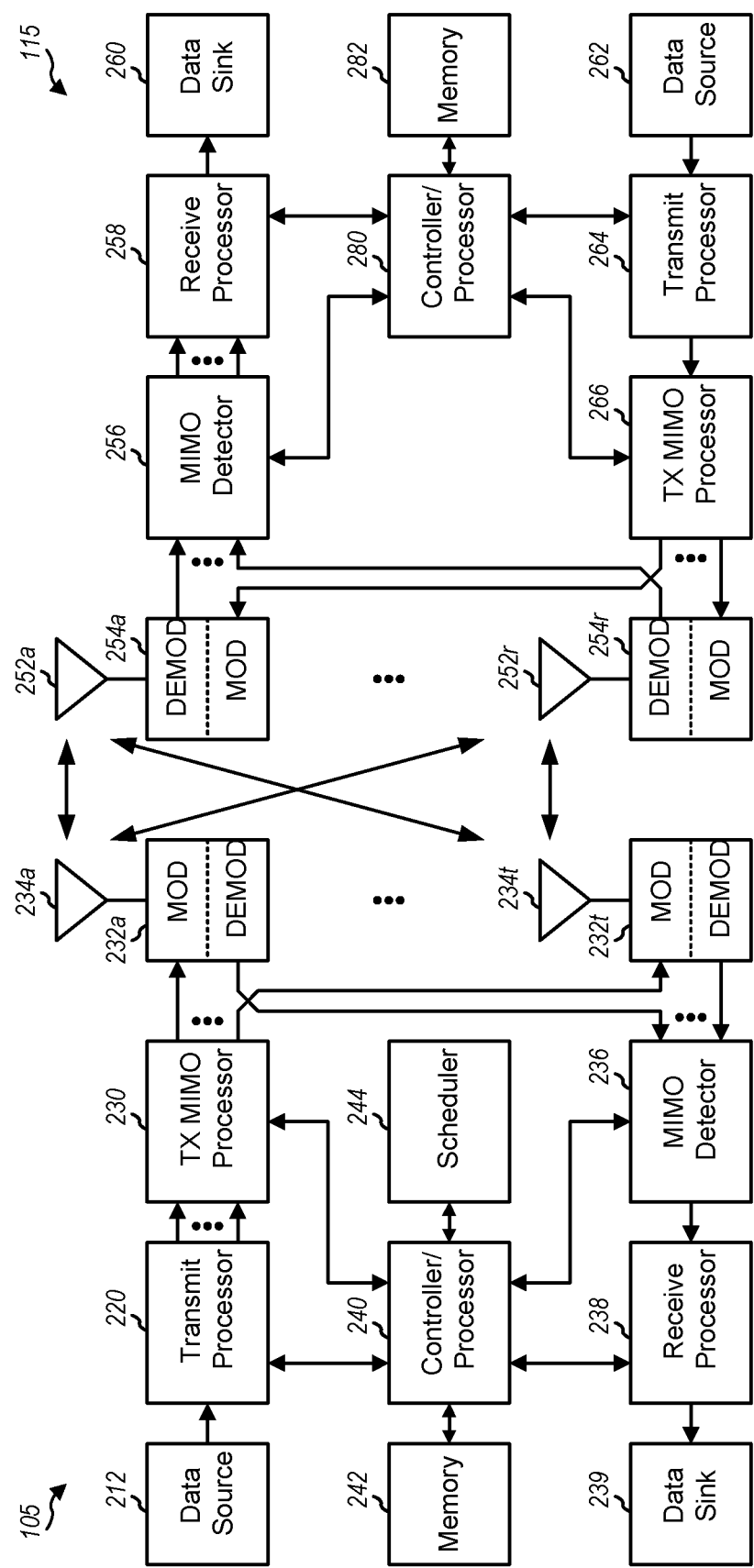
FIG. 2 is a block diagram conceptually illustrating a design of a base station/eNB and a UE configured according to one aspect of the present disclosure.

FIG. 2 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 234a through 234t, and the UE 120 may be equipped with antennas 252a through 252r.

At the eNB 110, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the eNB 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 110. At the eNB 110, the uplink signals from the UE 120 may be received by the antennas 234, processed by the demodulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the eNB 110 and the UE 120, respectively. The controller/processor 240 and/or other processors and modules at the eNB 110 may perform or direct the execution of various processes for the techniques described herein. The controllers/processor 280 and/or other processors and modules at the UE 120 may also perform or direct the execution of the functional blocks illustrated in FIG. 6, and/or other processes for the techniques described herein. The memories 242 and 282 may store data and program codes for the eNB 110 and the UE 120, respectively. A scheduler 244 may schedule UEs for data transmission on the downlink and/or uplink.

Figure 3:
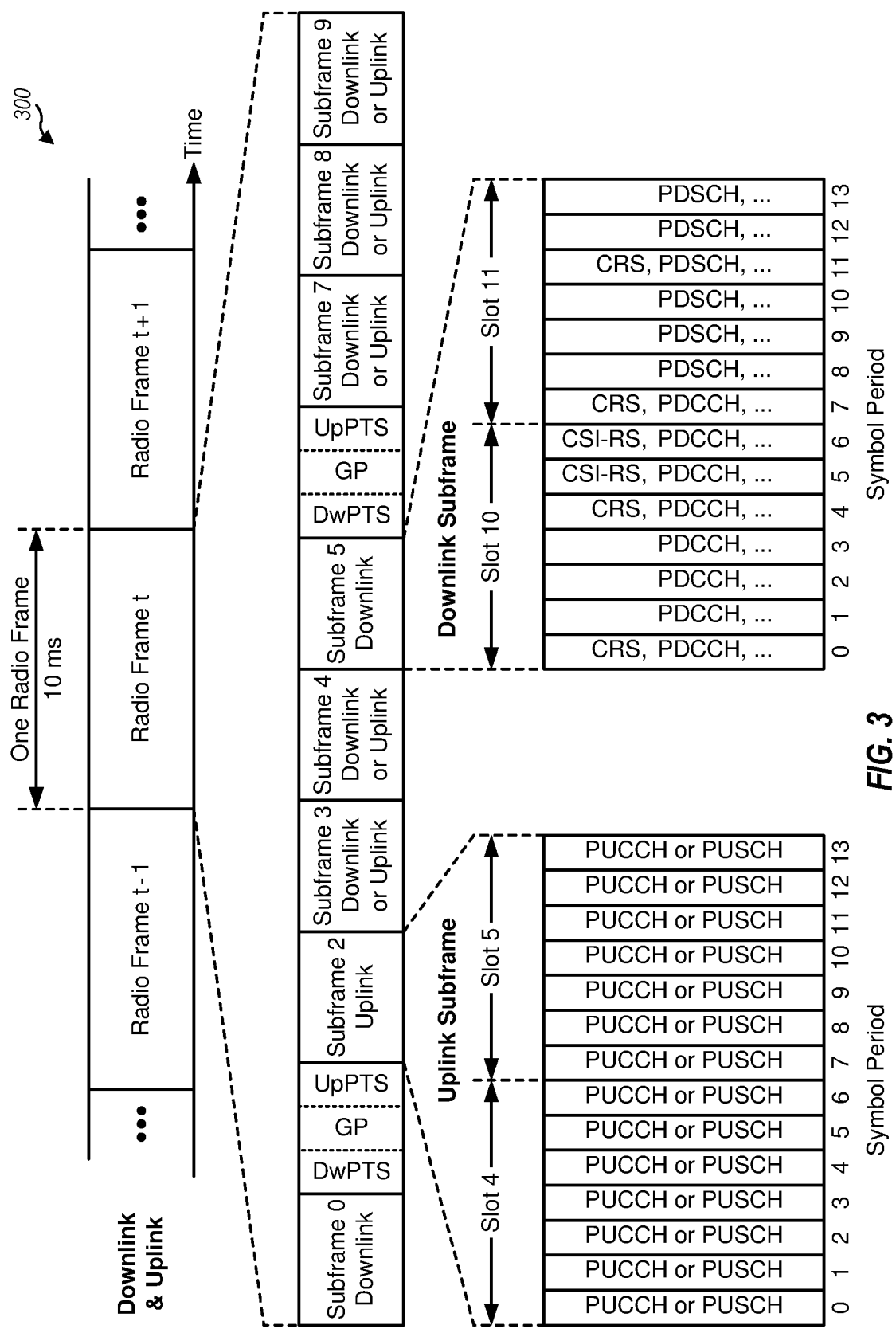
FIG. 3 is a block diagram illustrating an exemplary frame structure for TDD in LTE.

The LTE communications standard supports both FDD and TDD frame structures. FIG. 3 shows an exemplary frame structure 300 for TDD in LTE. The transmission timeline for the downlink and uplink may be partitioned into units of radio frames, and each radio frame may be partitioned into 10 subframes with indices of 0 through 9. LTE supports a number of uplink-downlink configurations for TDD. Subframes 0 and 5 are used for the downlink and subframe 2 is used for the uplink for all uplink-downlink configurations. Subframes 3, 4, 7, 8 and 9 may each be used for the downlink or uplink depending on the uplink-downlink configuration. Subframe 1, also known as a special subframe, includes three special fields composed of a Downlink Pilot Time Slot (DwPTS) used for downlink control channels as well as data transmission, a Guard Period (GP) of no transmission, and an Uplink Pilot Time Slot (UpPTS) used for either a physical random access channel (PRACH) or sounding reference signals (SRS) or both. Subframe 6 may be a special subframe, or a downlink subframe depending on the uplink-downlink configuration. The DwPTS, GP and UpPTS may have different durations depending on special subframe configurations and other configurations (e.g., whether a normal cyclic prefix, CP, or an extended CP is configured for downlink and/or uplink). If subframe 6 is a special subframe, the same duration of DwPTS, GP, and UpPTS as subframe 1 would be applied. For TDD, each subframe used for the downlink may be referred to as a downlink subframe, and each subframe used for the uplink may be referred to as an uplink subframe.

Table 1 lists seven exemplary uplink-downlink configurations available in an LTE network supporting TDD operation. Each uplink-downlink configuration indicates whether each subframe is a downlink subframe (denoted as "D" in Table 1), or an uplink subframe (denoted as "U" in Table 1), or a special subframe (denoted as "S" in Table 1). As shown in Table 1, uplink-downlink configurations 1 through 5 have more downlink subframes than uplink subframes in each radio frame.

TABLE 1

| Uplink-Downlink Config-uration | Downlink-to-Uplink Switch-point periodicity | Subframe Number n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Note that there are two switching periodicities, 5 ms and 10 ms, in the collection of subframe configurations. In the subframe configurations with a 5 ms periodicity, there are two special subframes in one frame (10 ms). In the subframe configurations with a 10 ms periodicity, there is one special subframe per frame. Each special subframe includes three parts: DwPTS, GP and UpPTS, where the division among the three parts are configurable. There are 9 special subframe configurations for normal and extended cyclic prefix conditions in LTE Rel-8/9/10 and one more special subframe configuration introduced for normal and extended cyclic prefix conditions, respectively, in LTE Rel-11. The supported special subframe configurations for normal cyclic prefix conditions are identified in Table 2.

TABLE 2

LTE Special Subframe Configurations

| 1 UpPTS Symbol | 2 UpPTS Symbols |
|---|---|
| SSP0: 3:10:1 | SSP5: 3:9:2 |
| SSP1: 9:4:1 | SSP6: 9:3:2 |
| SSP2: 10:3:1 | SSP7: 10:2:2 |
| SSP3: 11:2:1 | SSP8: 11:1:2 |
| SSP4: 12:1:1 | SSP9: 6:6:2 |

The different special subframe configurations include different lengths of DwPTS, e.g., {3, 6, 9, 10, 11, 12} and UpPTS, e.g., {1, 2}, such as 3:9:2, 3:10:1, 9:3:2, 10:2:2, 6:6:2.

Figure 4:
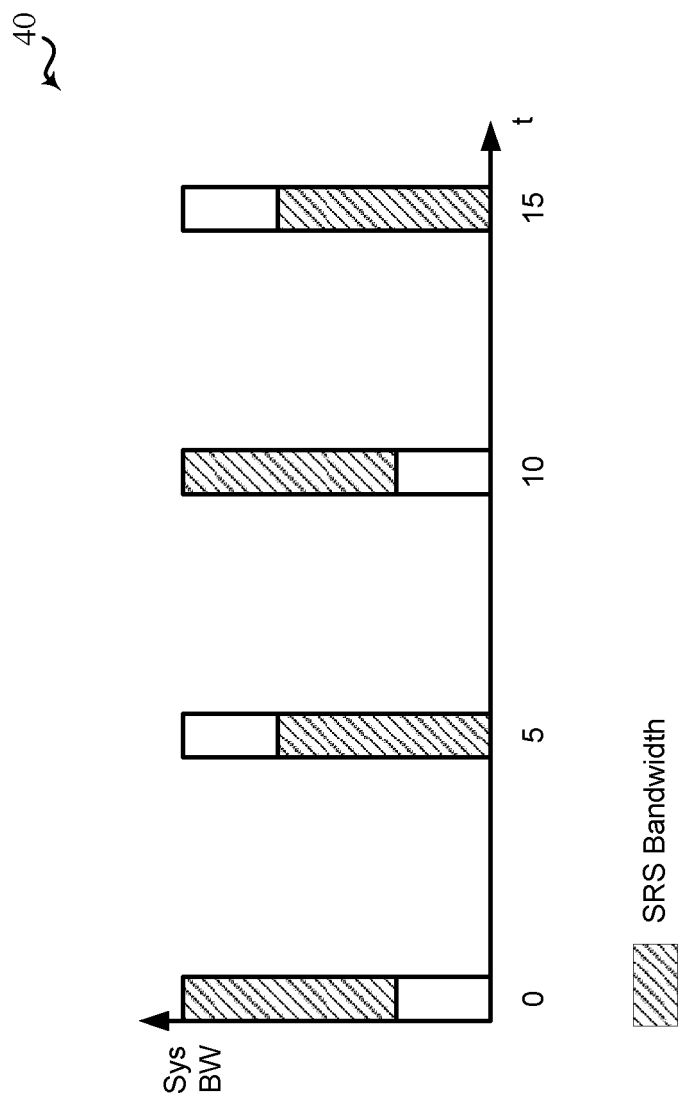
FIG. 4 is a block diagram illustrating SRS bandwidth in successive UpPTS occasions over timeline.

SRS transmission is important for LTE time division duplex (TDD). SRS is important for reciprocity based downlink beamforming. It also enables uplink frequency selective scheduling and link adaptation. However, because of the potential short physical random access channel (PRACH) transmitted in UpPTS special subframes, SRS transmission in UpPTS is different than in normal uplink subframes. FIG. 4 is a block diagram illustrating SRS bandwidth in successive UpPTS occasions over timeline 40. For SRS transmission in UpPTS, asymmetric SRS bandwidth is allocated with the frequency domain starting position for the SRS transmission hopping every UpPTS occasion. In contrast, SRS transmission in normal uplink subframes occur over symmetric SRS bandwidth allocation centered in the system bandwidth.

With current configurations, SRS capacity of in LTE TDD is limited. When configured in UpPTS only, 32 users may be supported for a single SRS transmission port, while 16 users are supported for dual SRS transmission ports. When configured in both UpPTS and normal uplink subframes, 48 users may be supported for a single SRS transmission port, while 24 users are supported for dual SRS transmission ports. The assumptions with regard to these capacity figures include a 5 ms SRS periodicity with two special subframes per 10 ms, wideband SRS, LTE UL/DL configuration 2 (DSUDDDSUDD), and UpPTS of 2 symbols. However, this SRS capacity is insufficient considering proposed full dimension MIMO (FD-MIMO) technologies. As such, methods for SRS capacity enhancements have been proposed in order to improve channel reciprocity based FD-MIMO. For example, increasing the number of UpPTS symbols for SRS may increase SRS capacity. Additionally, increasing the number of comb from 2 to 4 may also be considered to increase SRS capacity. Table 3 illustrates the SRS capacity for SRS transmissions with one and two SRS transmission ports.

TABLE 3

SRS Capacity for 1 and 2 Tx Ports

| SRS in UpPTS Only | | SRS in Both UpPTS and Normal SF | |
|---|---|---|---|
| 1 SRS Tx Port | 2 SRS Tx Ports | 1 SRS Tx Port | 2 SRS Tx Ports |
| 32 | 16 | 48 | 24 |

With an increase in the number of UpPTS symbols, one potential issue that may arise is how to signal the new UpPTS configuration to UE. One possible solution is to introduce new special subframe configurations in SIB 1, such as the new SSF configurations in Table 4 below. The new special subframe configuration each include a longer UpPTS. This means that for a 5 ms switching periodicity, a longer UpPTS may be configured in both special subframes, SF #1 and #6. Table 4 provides example new special subframe configurations for longer UpPTS.

TABLE 4

New Special Subframe Configurations with Longer UpPTS

| 3 UpPTS Symbols | 4 UpPTS Symbols | 6 UpPTS Symbols | 9 UpPTS Symbols |
|---|---|---|---|
| SSP10: 3:8:3 | SSP14: 3:7:4 | SSP17: 3:5:6 | SSP19: 3:2:9 |
| SSP11: 9:2:3 | SSP15: 9:1:4 | SSP18: 6:2:6 | |
| SSP12: 10:1:3 | SSP16: 6:4:4 | | |
| SSP13: 6:5:3 | | | |

However, because there are 14 symbols in each special subframe, a longer UpPTS implies a shorter DwPTS for the legacy UEs. For example, for a 4 symbol UpPTS, the length of DwPTS is limited to either 3, 6, or 9 symbols (e.g., special subframe configuration #0/5 with 3 DwPTS symbols, special subframe configuration #1/6 with 9 DwPTS symbols and special subframe configuration #9 with 6 DwPTS symbols). However, not all UEs would support special subframe configuration #9 (6:6:2). If a duration of 2 OFDM symbols is required for GP, legacy UEs, that do not support 6:6:2, may be configured for special subframe configuration #0/5. In such case. PDSCH transmission in DwPTS would not be available because of insufficient downlink symbols, which may lead to significant downlink throughput loss. For example, with a TDD UL/DL configuration 1 (DSUUDDSUUD), this lack of PDSCH transmission would results in 10/(14+10+14)=26% peak rate loss.

According to one aspect of the present disclosure, the configuration of the longer UpPTS can be independent for special subframe #1 and #6, for 5 ms switching periodicity. For example, a longer UpPTS may be configured only in subframe #1, while a shorter UpPTS is configured in subframe #6. Alternatively, both subframe #1 and subframe #6 may be configured with a longer UpPTS but the length of the UpPTS for subframe #1 is different than the length for subframe #6. With this independent configuration, downlink transmissions in DwPTS of legacy UEs may only be affected in one of subframe #1 and #6, but not necessarily both. In such case, the serving eNB may flexibly control and select the special subframe configurations to maintain a performance tradeoff between SRS capacity for new UEs compatible with the additional UpPTS length, and the downlink throughput of legacy UEs.

For example, in one example implementation aspect, the serving eNB may determine to reconfigure subframe #1 and subframe #6 to longer UpPTS based on the number of new UEs that support FD-MIMO operations in the cells. When the number of such new UEs increase, the serving eNB may firstly reconfigure subframe #1 to a 3:2:9 special subframe configuration for SRS transmissions, so that subframe #6 may still be used for downlink transmission to legacy UEs. As more new UEs compatible with FD-MIMO are present in the coverage area of the serving eNB, both subframes #1 and #6 may be reconfigured to a 3:2:9 configuration for SRS transmission.

It should further be noted that another implementation aspect of the present disclosure may be a more dynamic process. For example, the serving eNB may assign the additional symbols in the longer UpPTS only for aperiodic SRS transmission, which is one-short transmission on demand. Therefore, the serving eNB may flexibly assign resources in subframes #1 and #6 for downlink or uplink SRS using various L1 signaling, e.g., DCI format for both legacy and new UEs.

Various aspects of the present disclosure may also be beneficial for small cell operation with different UL/DL configurations. In such scenarios, it would be relatively meaningless to configure a longer UpPTS in subframe #6 if neighboring cell is in a normal downlink subframe.

Figure 5:
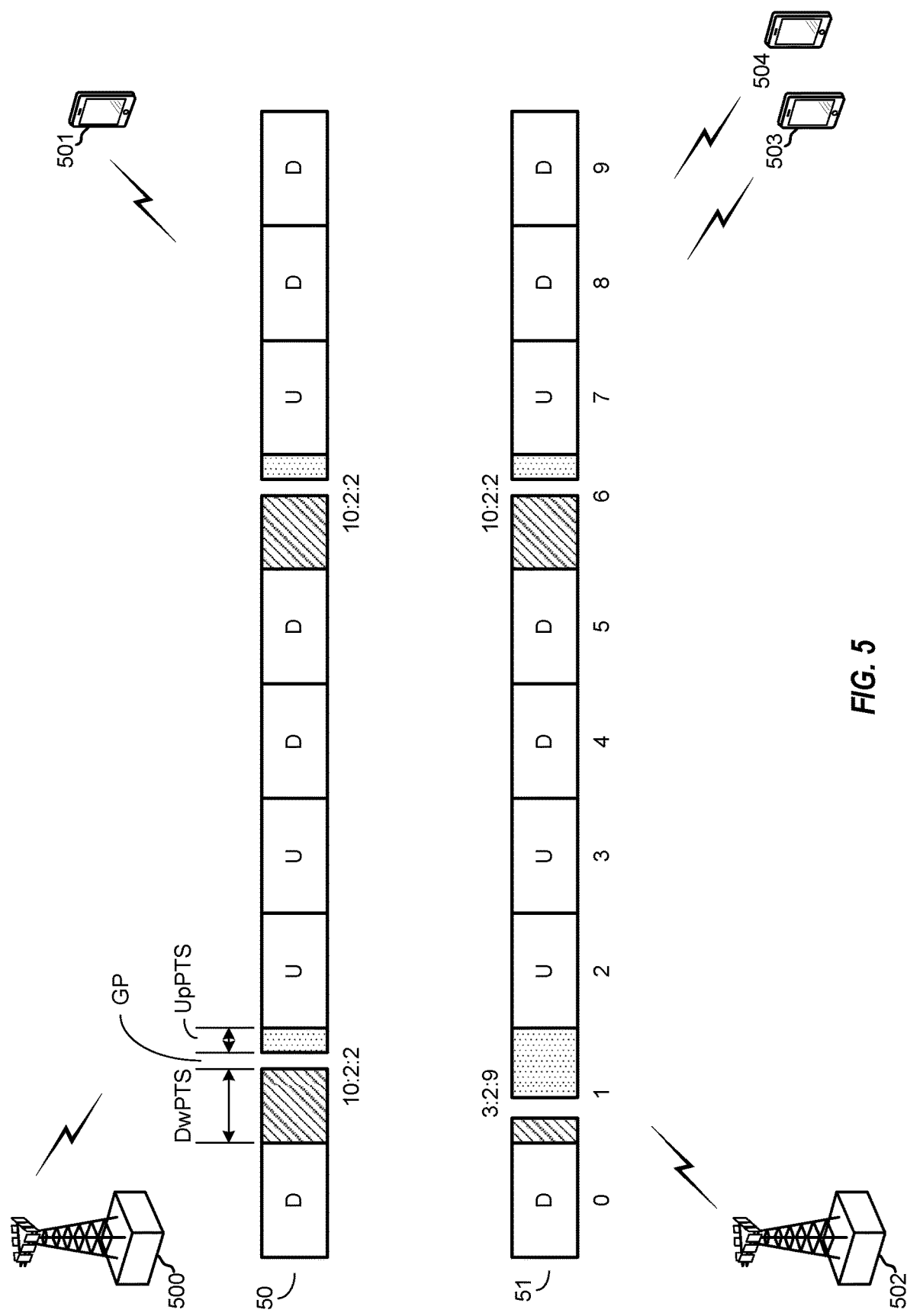
FIG. 5 is a block diagram illustrating a transmission frame having special subframe configuration defining a longer UpPTS in subframe 1 according to one aspect of the present disclosure.

FIG. 5 is a block diagram illustrating transmission frame 51 of communication between base station 502 and UEs 503 and 504, having special subframe configuration defining a longer UpPTS in subframe 1 according to one aspect of the present disclosure. UE 503 is a new UE that is compatible with a UpPTS configuration that includes assigned resources of a greater length, e.g., at least three assigned symbols, while UE 504 is a legacy UE expecting a standard UpPTS of up to two assigned symbols. Transmission frame 50, between base station 500 and UE 501, illustrates the legacy configurations in which each of special subframes #1 and #6 have the same configuration with a two-symbol UpPTS (10:2:2). Transmission frame 51, however, as defined according to various aspects of the present disclosure, includes special subframe #1 that has been independently configured by base station 502 with a longer UpPTS (3:2:9), while maintaining the configuration of special subframe #6 to be compatible with legacy UEs (10:2:2). In such aspects, legacy UEs, such as UE 504, are not scheduled in subframe #1 so that new UEs, such as UE 503, may transmit SRS in the additional UpPTS symbols. Subframe #6 can still be used for down transmission for both the legacy and new UEs, UEs 503-504.

For SRS transmissions in additional UpPTS symbols, additional consideration may be given to mapping frequency resources to the SRS transmissions. In one alternative, as with existing SRS transmissions in UpPTS, an asymmetric SRS bandwidth may be defined which alternates starting positions every UpPTS occasion using frequency hopping. In a second alternative, symmetric mapping may be used, as with normal uplink subframe SRS transmissions, in which SRS transmissions are mapped to the middle part of the system bandwidth. In networks configured to support shorter PRACH for the additional UpPTS symbols, the first alternative of asymmetric SRS bandwidth may be used. Otherwise, either alternative may be selected by the network and configured based on higher layer signaling or fixed in the specification. In such aspect, selection of which alternative to implement may be made based on whether it may be more beneficial to attempt acquisition of full channel information (e.g., such as through the frequency hopping) or attempted acquisition of only the middle bandwidth channel information (e.g., such as through symmetric mapping).

Figure 6:
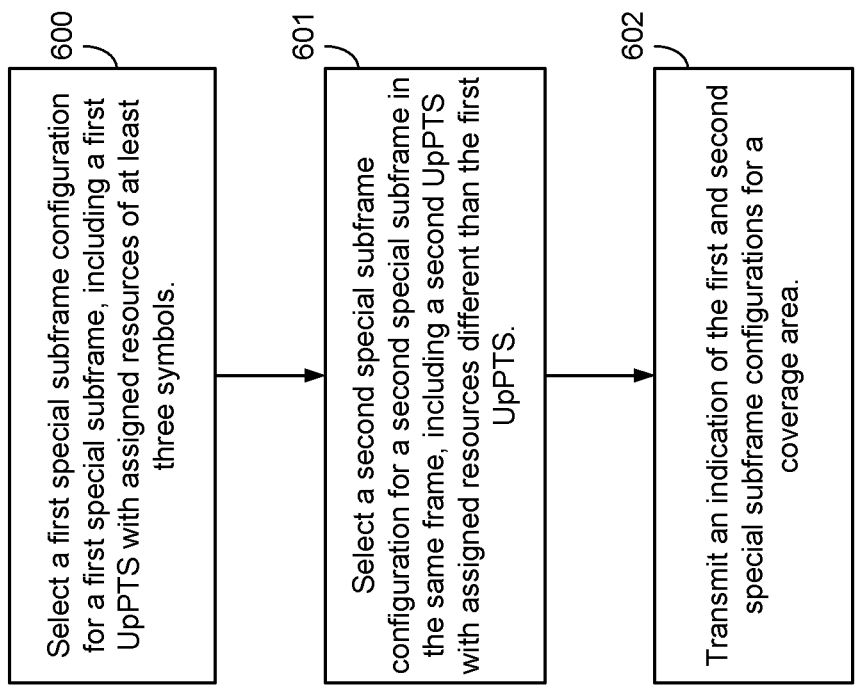
FIG. 6 is a block diagram illustrating example blocks executed to implement one aspects of the present disclosure.

FIG. 6 is a block diagram illustrating example blocks executed to implement one aspect of the present disclosure. At block 600, a first special subframe configuration is selected by a base station for a first special subframe, wherein the first special subframe configuration includes a first UpPTS with assigned resources of at least three symbols. The at least three symbols include the two legacy symbols associated with UpPTS and one or more additional symbols.

At block 601, the base station selects a second special subframe configuration for a second special subframe of the same frame, wherein the second special subframe configuration includes a second UpPTS with assigned resources different than the first UpPTS. The length of the second UpPTS resources may be shorter, such as any of the two legacy symbols. The length of the second UpPTS may also be longer, such as with three or more symbols. However, a length of the second UpPTS may be different than the length of the first UpPTS.

At block 602, the base station transmits an indication of the first and second special subframe configurations for a coverage area. In one example implementation, the base station may transmit the indication in a broadcast-type message, such as a SIB message. In such implementation, all UEs receiving service within the coverage area will receive the system information signals transmitted by the serving base station identifying the configurations for the first and second special subframes. In another alternative implementation, the serving base station may transmit UE-specific signals with the indication, such as through RRC signaling. In such implementation, only UE scheduled to transmit SRS in the additional UpPTS symbols will receive the indication of the configuration. The other UEs will assume normal operations with a legacy UpPTS configuration having up to 2 symbols.

Figure 7:
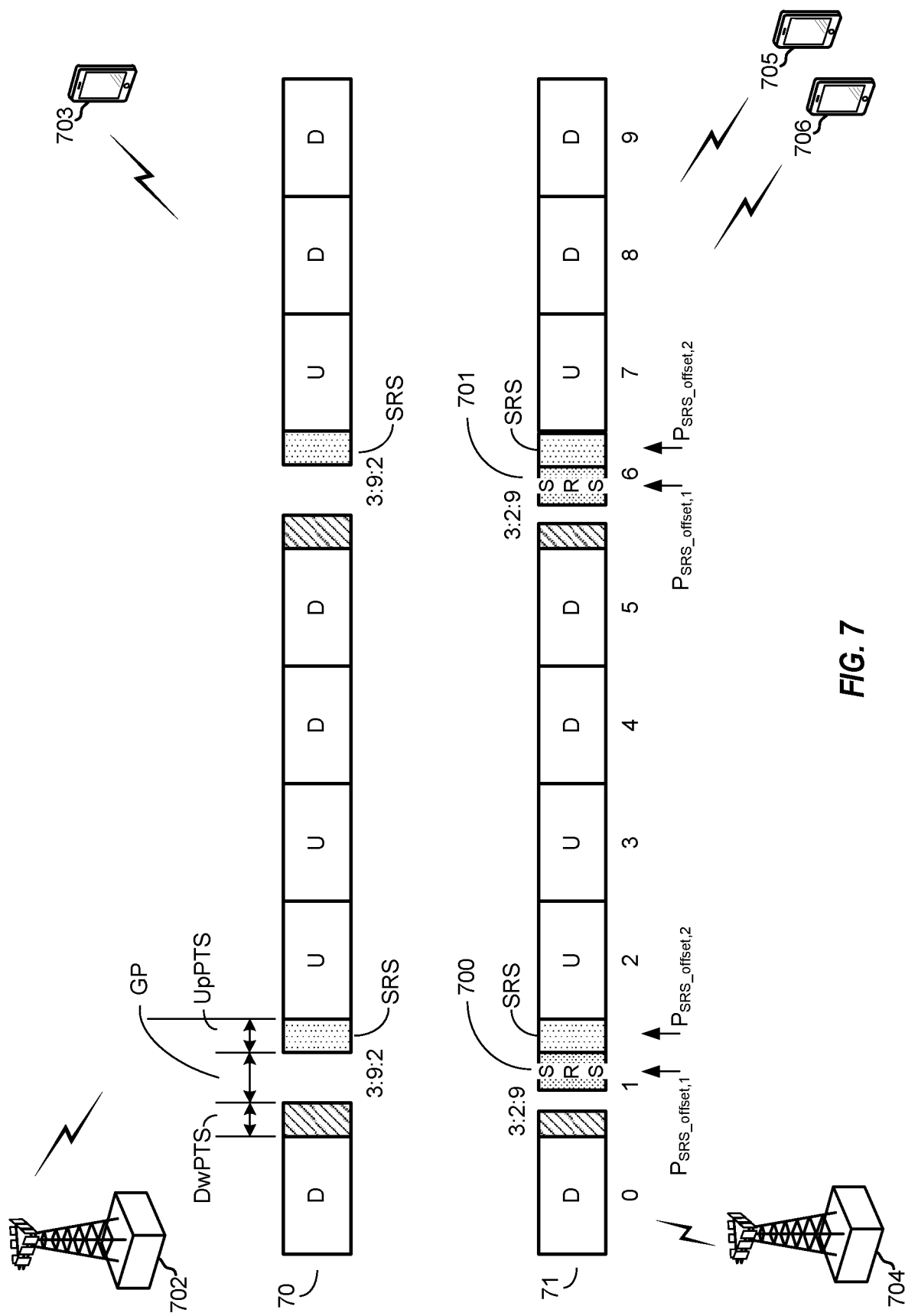
FIG. 7 is a block diagram illustrating a transmission stream between UEs and a base station configured according to one aspect of the present disclosure.

FIG. 7 is a block diagram illustrating transmission stream 71 between UEs 705 and 706 and a base station 704 configured according to one aspect of the present disclosure. The configuration of additional UpPTS symbols for SRS may be cell specific, such that one cell may configure a longer UpPTS, such as the cell serviced by base station 704, while another cell may not, such as the cell serviced by base station 702. If SRS transmission in the additional UpPTS symbols for a given cell, the coverage area of base station 704, collides with a GP of a neighboring cell, the coverage area of base station 702, there may be less inter-cell interference compared to SRS transmissions in other symbols and subframes. Therefore, when a UE, such as UEs 705 and 706 is configured to transmit SRS in both the additional UpPTS symbols and legacy symbols, at least two SRS power control parameters may be configured for the UE. e.g., two $P_{SRS\_offset}$ parameters for SRS transmission in new and old SRS resources respectively. As illustrated in FIG. 7, transmission stream 70 occurs between base station 702 and UE 703 within cell A, while transmission stream 71 occurs between base station 704 and UEs 705 and 706 within cell B. The additional UpPTS symbols 700 and 701 of transmission stream 71 occur during the GPs of transmission stream 70. At least two different SRS power control parameters may be used by UEs 705 and 706 transmitting SRS in the additional UpPTS symbols and legacy symbols. One SRS power control parameter for transmissions during the additional UpPTS symbols 700 and 701, and another SRS power control parameter during the legacy symbols. With the reduced inter-cell interference during the additional UpPTS symbols 700 and 701, in one example implementation, UE 705 or 706 may transmit the SRS at a reduced power without compromising reliability. The power control parameter may be selected based on neighboring cell special subframe configuration. Generally, the serving cell may measure interference in both additional and legacy symbols and then determine the corresponding SRS power control parameters.

Figure 8:
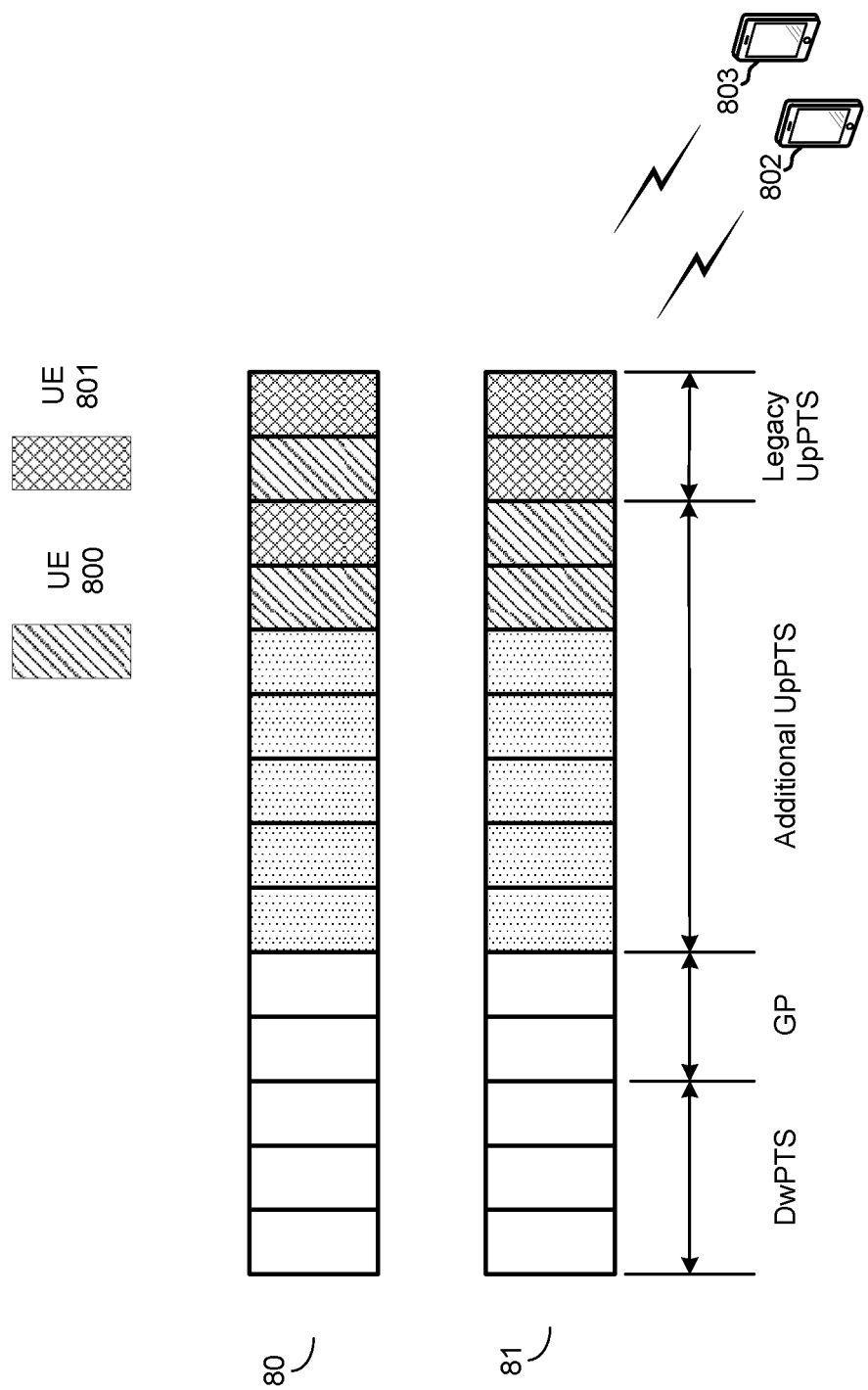
FIG. 8 is a block diagram illustrating assignment of SRS resources according to aspects of the present disclosure.

FIG. 8 is a block diagram illustrating assignment of SRS resources to UEs 800 and 801, configured according to aspects of the present disclosure. Currently, when two SC-FDMA symbols exist in UpPTS of the given serving cell, both symbols can be used for SRS transmission. For example, for trigger type 0 periodic SRS transmission, both symbols can be assigned to the same UE and for trigger type 1 aperiodic SRS, only one of the two symbols is configured to a UE based on higher layer signalling. When more than two symbols exist in UpPTS, the configuration of the UpPTS symbols for SRS transmission can have the following options: in a first option, the additional SRS resources can be assigned to the same UE (e.g., UE 800 or UE 801) together with legacy resources for both type 0 and 1 SRS transmission. With reference to FIG. 8, special subframe 80 is illustrated having a 3:2:9 configuration. For the type 0 period SRS transmission SRS resources for UE 800 and UE 801 may be assigned across the additional and legacy UpPTS symbols of special subframe 80. In a second option, the additional SRS resources cannot be configured together with legacy resources. For example, for type 0 periodic SRS transmissions, either the additional new resources or the legacy resources, with up to two SF-FDMA symbols, may be assigned, but mixed resources cannot be assigned to the same UE for type 0 periodic or type 1 aperiodic SRS transmission. As illustrated in special subframe 81, with a 3:2:9 configuration, UE 800 may be assigned two symbols in the additional UpPTS symbols, while UE 801 is assigned the two symbols from the legacy UpPTS symbols.

It should be noted that the first alternative, in which a single UE may be assigned SRS resources across both the additional UpPTS symbols and legacy symbols may be the less preferred of the two options. Because the SRS transmission power may be different in between the two symbols in UpPTS special subframe due to different $P_{SRS\_offset}$, there may be difficulties in both transmission and reliable reception of the SRS transmissions.

If an extended comb is supported, an additional aspect of the present disclosure provides for using the extend comb value for the additional UpPTS symbols, so that there is no backward compatible issues on legacy SRS resources for coexistence with legacy UE. For extended comb value 4, the comb per SRS port may be derived from $n_{SRS}^{CS}=\{0, \ldots, 3\}$ and transmissionComb=$\{0, 1, 2, 3\}$. For 2 SRS ports: port multiplexing may be determined using only cyclic shift (CS), while for 4 SRS ports: port multiplexing may be determined using both CS and comb. If both repeat factor (RPF)=2 and 4 are configured. e.g. corresponding to different SRS parameter sets of type 1 SRS, it may be preferable to have a separate SRS power control parameters for each comb value. In such example aspect, an additional $P_{SRS\_offset}$ may be configured for type 1 aperiodic SRS in which the usage depends on the corresponding comb value.

Example: derivation of the CS and comb for SRS with RPF=4

TABLE 5

Derivation of CS and comb for SRS with RPF = 4

| $n_{SRS}^{CS}$ | $CS(n_{SRS}^{CS},\tilde{p})$ | | | | comb | | | |
|---|---|---|---|---|---|---|---|---|
| | $\tilde{p}=0$ | $\tilde{p}=1$ | $\tilde{p}=2$ | $\tilde{p}=3$ | $\tilde{p}=0$ | $\tilde{p}=1$ | $\tilde{p}=2$ | $\tilde{p}=3$ |
| 0 | 0 | 4 | 2 | 6 | tC | tC | tC + 2 | tC + 2 |
| 1 | 2 | 6 | 4 | 0 | tC | tC | tC + 2 | tC + 2 |
| 2 | 4 | 0 | 6 | 2 | tC | tC | tC + 2 | tC + 2 |
| 3 | 6 | 2 | 0 | 4 | tC | tC | tC + 2 | tC + 2 |

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Any of the functional blocks illustrated in FIG. 6, and/or other processes for the techniques described herein may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone: C alone; A and B in combination: A and C in combination: B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
selecting a first special subframe configuration for a first special subframe of a frame, wherein the first special subframe configuration includes a first uplink pilot time slot (UpPTS) with assigned resources of at least three symbols, and wherein the at least three symbols include two legacy symbols and one or more additional symbols;
selecting a second special subframe configuration for a second special subframe of the frame, wherein the second special subframe configuration includes a second UpPTS with assigned resources of a second resource length different than a first resource length assigned to the first UpPTS;
extending a comb for sounding reference signal (SRS) transmissions with assigned resources of the one or more additional symbols;
determining a power control parameter to each SRS resource assigned using an assigned comb value corresponding to the SRS resource; and
transmitting an indication of the first and second special subframe configurations for a coverage area.

2. The method of claim 1, wherein the resources assigned to the second UpPTS include one of:
two or fewer symbols; or
at least three symbols and different than the resources assigned to the first UpPTS.

3. The method of claim 1, further including:
scheduling the SRS transmissions in the one or more additional symbols, wherein the scheduling is one of:
asymmetrically scheduling a starting position for the SRS transmissions via frequency hopping across a system bandwidth for each UpPTS occasion; and
symmetrically scheduling the starting position for the SRS transmissions to a middle portion of the system bandwidth.

4. The method of claim 3, wherein short physical random access channel (PRACH) is supported in the one or more additional symbols, the scheduling includes asymmetrically scheduling the starting position for the SRS transmissions via frequency hopping across the system bandwidth for each UpPTS occasion.

5. The method of claim 1, further including:
assigning at least two symbols to a user equipment for SRS transmission, wherein the at least two symbols include one of:
at least one symbol of the two legacy symbols and at least one symbol of the one or more additional symbols;
the two legacy symbols; or
at least two of the one or more additional symbols.

6. The method of claim 1, further including:
extending a comb for SRS transmissions with assigned resources of the one or more additional symbols, wherein the comb is extended up to a comb value four;
assigning the comb value four as SRS resources for the one or more additional symbols;
assigning a standard comb value two as SRS resources for the two legacy symbols; and
transmitting an assignment indicator identifying the comb value four as SRS resources for the one or more additional symbols and the standard comb value two as SRS resources for the two legacy symbols.

7. The method of claim 6, further including:
determining a power control parameter to each SRS resource assigned with one of: the comb value four or the standard comb value two.

8. The method of claim 1, wherein the first special subframe configuration and the second special subframe configuration are selected by a base station based at least in part on at least one of: a sounding reference signal (SRS) capacity for one or more compatible user equipments (UEs), or a downlink throughput for one or more legacy UEs.

9. The method of claim 1, further including:
refraining from scheduling one or more legacy UEs during the first special subframe.

10. The method of claim 1, further comprising:
assigning a first comb value as SRS resources for the one or more additional symbols; and
assigning a second comb value as SRS resources for the two legacy symbols.

11. The method of claim 10, wherein the first comb value includes a comb value four, and wherein the second comb value includes a standard comb value two.

12. An apparatus configured for wireless communication, comprising:
means for selecting a first special subframe configuration for a first special subframe of a frame, wherein the first special subframe configuration includes a first uplink pilot time slot (UpPTS) with assigned resources of at least three symbols, and wherein the at least three symbols include two legacy symbols and one or more additional symbols;
means for selecting a second special subframe configuration for a second special subframe of the frame, wherein the second special subframe configuration includes a second UpPTS with assigned resources of a second resource length different than a first resource length assigned to the first UpPTS;
means for extending a comb for sounding reference signal (SRS) transmissions with assigned resources of the one or more additional symbols;
means for determining a power control parameter to each SRS resource assigned using an assigned comb value corresponding to the SRS resource; and
means for transmitting an indication of the first and second special subframe configurations for a coverage area.

13. The apparatus of claim 12, wherein the resources assigned to the second UpPTS include one of:
two or fewer symbols; or
at least three symbols and different than the resources assigned to the first UpPTS.

14. The apparatus of claim 12, further including:
means for scheduling the SRS transmissions in the one or more additional symbols, wherein the means for scheduling is one of:
means for asymmetrically scheduling a starting position for the SRS transmissions via frequency hopping across a system bandwidth for each UpPTS occasion; and
means for symmetrically scheduling the starting position for the SRS transmissions to a middle portion of the system bandwidth.

15. The apparatus of claim 14, wherein short physical random access channel (PRACH) is supported in the one or more additional symbols, the means for scheduling includes means for asymmetrically scheduling the starting position for the SRS transmissions via frequency hopping across the system bandwidth for each UpPTS occasion.

16. The apparatus of claim 12, further including:
means for assigning at least two symbols to a user equipment for SRS transmission, wherein the at least two symbols include one of:
at least one symbol of the two legacy symbols and at least one symbol of the one or more additional symbols;
the two legacy symbols; or
at least two of the one or more additional symbols.

17. The apparatus of claim 12, further including:
means for extending a comb for SRS transmissions with assigned resources of the one or more additional symbols, wherein the comb is extended up to a comb value four;
means for assigning the comb value four as SRS resources for the one or more additional symbols;
means for assigning a standard comb value two as SRS resources for the two legacy symbols; and
means for transmitting an assignment indicator identifying the comb value four as SRS resources for the one or more additional symbols and the standard comb value two as SRS resources for the two legacy symbols.

18. The apparatus of claim 17, further including:
means for determining a power control parameter to each SRS resource assigned with one of: the comb value four or the standard comb value two.

19. The apparatus of claim 12, wherein the first special subframe configuration and the second special subframe configuration are selected by a base station based at least in part on at least one of: a sounding reference signal (SRS) capacity for one or more compatible user equipments (UEs), or a downlink throughput for one or more legacy UEs.

20. The apparatus of claim 12, further including:
means for refraining from scheduling one or more legacy UEs during the first special subframe.

21. A non-transitory computer-readable medium having program code recorded thereon, the program code comprising:
program code for causing a computer to select a first special subframe configuration for a first special subframe of a frame, wherein the first special subframe configuration includes a first uplink pilot time slot (UpPTS) with assigned resources of at least three symbols, and wherein the at least three symbols include two legacy symbols and one or more additional symbols;
program code for causing the computer to select a second special subframe configuration for a second special subframe of the frame, wherein the second special subframe configuration includes a second UpPTS with assigned resources of a second resource length different than a first resource length assigned to the first UpPTS;
program code for extending a comb for sounding reference signal (SRS) transmissions with assigned resources of the one or more additional symbols;
program code for determining a power control parameter to each SRS resource assigned using an assigned comb value corresponding to the SRS resource; and
program code for causing the computer to transmit an indication of the first and second special subframe configurations for a coverage area.

22. The non-transitory computer-readable medium of claim 21, wherein the resources assigned to the second UpPTS include one of:
two or fewer symbols; or
at least three symbols and different than the resources assigned to the first UpPTS.

23. The non-transitory computer-readable medium of claim 21, further including:
program code for causing the computer to extend a comb for SRS transmissions with assigned resources of the one or more additional symbols, wherein the comb is extended up to a comb value four;
program code for causing the computer to assign the comb value four as SRS resources for the one or more additional symbols;
program code for causing the computer to assign a standard comb value two as SRS resources for the two legacy symbols; and
program code for causing the computer to transmit an assignment indicator identifying the comb value four as SRS resources for the one or more additional symbols and the standard comb value two as SRS resources for the two legacy symbols.

24. The non-transitory computer-readable medium of claim 23, further including:
program code for causing the computer to determine a power control parameter to each comb value of the comb value four.

25. The non-transitory computer-readable medium of claim 21, further including one of:
program code for causing the computer to transmit instruction to multiplex ports, with two SRS ports assigned, wherein the ports are multiplexed using cyclic shift; or
program code for causing the computer to transmit instruction to multiplex ports, with four SRS ports assigned, wherein the ports are multiplexed using cyclic shift and comb value.

26. An apparatus configured for wireless communication, the apparatus comprising:
at least one processor; and
a memory coupled to the at least one processor,
wherein the at least one processor is configured:
to select a first special subframe configuration for a first special subframe of a frame, wherein the first special subframe configuration includes a first uplink pilot time slot (UpPTS) with assigned resources of at least three symbols, and wherein the at least three symbols include two legacy symbols and one or more additional symbols;
to select a second special subframe configuration for a second special subframe of the frame, wherein the second special subframe configuration includes a second UpPTS with assigned resources of a second resource length different than a first resource length assigned to the first UpPTS;
to extend a comb for sounding reference signal (SRS) transmissions with assigned resources of the one or more additional symbols;
to determine a power control parameter to each SRS resource assigned using an assigned comb value corresponding to the SRS resource; and
to transmit an indication of the first and second special subframe configurations for a coverage area.

27. The apparatus of claim 26, further including configuration of the at least one processor to assign at least two symbols to a user equipment for SRS transmission, wherein the at least two symbols include one of:
the two legacy symbols; or
at least two of the one or more additional symbols.

28. The apparatus of claim 26, further including configuration of the at least one processor to:
- extend a comb for SRS transmissions with assigned resources of the one or more additional symbols, wherein the comb is extended up to a comb value four;
- assign the comb value four as SRS resources for the one or more additional symbols;
- assign a standard comb value two as SRS resources for the two legacy symbols; and
- transmit an assignment indicator identifying the comb value four as SRS resources for the one or more additional symbols and the standard comb value two as SRS resources for the two legacy symbols.

29. The apparatus of claim 28, further including configuration of the at least one processor to determine a power control parameter to each comb value of the comb value four.

30. The apparatus of claim 26, further including configuration of the at least one processor to one of:
- transmit instruction to multiplex ports, with two SRS ports assigned, wherein the ports are multiplexed using cyclic shift; or
- transmit instruction to multiplex ports, with four SRS ports assigned, wherein the ports are multiplexed using cyclic shift and comb value.

* * * * *